United States Patent
Cheung et al.

(10) Patent No.: US 7,732,941 B2
(45) Date of Patent: Jun. 8, 2010

(54) MULTI-MODULE CURRENT SHARING SCHEME

(75) Inventors: Chun Cheung, Brooklyn, NY (US); Stan Wietecha, South Bound Brook, NJ (US)

(73) Assignee: Intersil Americas Inc., Milpitas, CA (US)

( * ) Notice: Subject to any disclaimer, the term of this patent is extended or adjusted under 35 U.S.C. 154(b) by 365 days.

(21) Appl. No.: 11/775,306

(22) Filed: Jul. 10, 2007

(65) Prior Publication Data

US 2008/0238197 A1 Oct. 2, 2008

Related U.S. Application Data

(60) Provisional application No. 60/908,856, filed on Mar. 29, 2007.

(51) Int. Cl.
*H02J 3/14* (2006.01)

(52) U.S. Cl. .................................... 307/32

(58) Field of Classification Search ............ 307/32, 307/82
See application file for complete search history.

(56) References Cited

U.S. PATENT DOCUMENTS 7,425,779 B2 * 9/2008 Luo et al. .................... 307/82

* cited by examiner

*Primary Examiner*—Michael Rutland Wallis
(74) *Attorney, Agent, or Firm*—Howison & Arnott, L.L.P.

(57) ABSTRACT

A circuit provides multi-module current sharing for circuit modules. The circuit includes an error amplifier having a negative and a positive input and an output. The positive input of the error amplifier is connected to a reference voltage. A buffered differential amplifier has an output connected to the negative input of the error amplifier and a positive and a negative input. A correction current is sourced to the negative input of the buffered differential amplifier. A resistor connected to the negative input of the buffered differential amplifier has a value that controls the amount of current correction applied to the negative input of the buffer differential amplifier by the current correction source.

16 Claims, 5 Drawing Sheets

MULTI-MODULE CURRENT SHARING SCHEME

CROSS-REFERENCE TO RELATED APPLICATION

This application claims priority from U.S. Provisional Application Ser. No. 60/908,856, filed Mar. 29, 2007, entitled MULTI-MODULE CURRENT SHARING SCHEME, which is incorporated herein by reference.

TECHNICAL FIELD OF THE INVENTION

The present invention relates to systems for current balancing between multiple independent power modules, and more particularly, to a current sharing scheme having a wide dynamic output voltage range and the ability to disable the current sharing.

BACKGROUND

When a number of independent power modules are sharing a bus line, there is a need to achieve current balance between the power modules during steady state, system power up, system power down and load transients. FIGS. 1-3 illustrate prior art implementations for achieving a current balance between multiple independent power modules during these conditions.

FIG. 1 illustrates a configuration wherein a correction current 102 (ICOR) is a current sink to the negative input of an error amplifier 104. The output of the error amplifier 104 is connected to the COMP pin of the associated power module. The positive input of the error amplifier 104 is connected to receive a reference voltage $V_{REF}$. The negative input of the error amplifier 104 is also connected to the FB pin of the associated power module. A resistor 106 is connected between the FB pin and the output of a buffered differential amplifier 108. The inputs of the buffered differential amplifier 108 are connected to a resistor divider network consisting of a resistor $R_{FB}$ and a resistor $R_{OS}$. The resister $R_{FB}$ 110 is connected between the output voltage $V_{OUT}$ and node 114 connected to the positive input of the buffered differential amplifier 108. The resister $R_{OS}$ 112 is connected between node 114 and ground node 116. Ground node 116 is also connected to the negative input of the differential amplifier 108. While the configuration of FIG. 1 provides for current sharing, it limits the choices for the feedback resistor 106 and for choices of the resistors of the compensation network consisting of resistors $R_{FB}$ and $R_{OS}$ 110 and 112.

FIG. 2 illustrates an alternative configuration wherein the error amplifier 204 has its output connected to the COMP pin of the associated power module. The negative input of the error amplifier 204 connected to the FB pin 218 of the associated power module and the positive input is connected to receive a reference voltage $V_{REF}$. The feedback resistor 206 is connected between the FB pin and the output of a buffered differential amplifier 208. In the configuration of FIG. 2, the correction current ICOR 202 is sourced to the positive input of buffered differential amplifier 208. The resistor divider network consisting of $R_{FB}$ resistor 210 and $R_{OS}$ resistor 212 are connected to the inputs of the buffered differential amplifier. Resistor $R_{FB}$ 210 is connected between the output voltage $V_{OUT}$ and node 214. The $R_{OS}$ resistor 212 is connected between node 214 and ground node 216. The negative input of the buffered differential amplifier 208 is also connected to the ground node 216. The configuration of FIG. 2 limits the choices of the resistor divider consisting of $R_{FB}$ resistor 210 and $R_{OS}$ resistor 212 and is not suitable for a wide range of output voltage applications which may require different combinations of the voltage divider network consisting of resistors 210 and 212.

FIG. 3 illustrates yet another further prior art configuration having a setup similar to that of FIGS. 1 and 2. An error amplifier 304 has its output connected to the COMP pin of the independent power module and its negative input connected to the FB pin of the independent power module. The positive input of the error amplifier has a voltage $V_{REF}$ applied to it through a resistor 318. The correction current, ICOR, is sourced to the positive input of the error amplifier 304. Resistor 306 is connected to the FB pin and to the output of a buffered differential amplifier 308. The positive and negative inputs of the buffered differential amplifier 308 are connected to a resistor divider network consisting of resistor $R_{FB}$ 310 and the resistor $R_{OS}$ 312. The $R_{FB}$ resistor 310 is connected between a voltage $V_{OUT}$ and node 314. The $R_{OS}$ resistor 312 is connected between node 314 and ground node 316, which is also connected to the negative input of the buffered differential amplifier 308. The configuration of FIG. 3 limits the current sharing range without an accessible $V_{REF}$ node. The configuration also affects overall output voltage accuracy when current sharing is not needed.

Thus, what is needed is a new configuration that may be used when limited pins are available on an independent power module in order to overcome the above-described limitations of FIGS. 1 though 3 without introducing an extra pin upon the independent power module package. It would additionally be desirable that this current sharing loop of the IC (controller) can be disabled and make no output voltage correction, but can be used to adjust the internal COMP voltage of the IC in multi-phase operation required multiple ICs.

SUMMARY

The present invention, as disclosed and described herein, comprises in one aspect thereof a circuit for providing multi-mode current sharing for a circuit module. The circuit includes an error amplifier having a negative and positive input and an output. The positive input of the error amplifier is connected to a reference voltage. A buffered differential amplifier has an output connected to the negative input of the error amplifier and further includes a positive and negative input. A correction current source is applied to the negative input of the buffered differential amplifier. A first resistor connected to the negative input of the buffered differential amplifier controls the amount of voltage correction applied to the negative input of the buffered differential amplifier by the correction current source, which has a maximum correction range.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION

Figure 1:
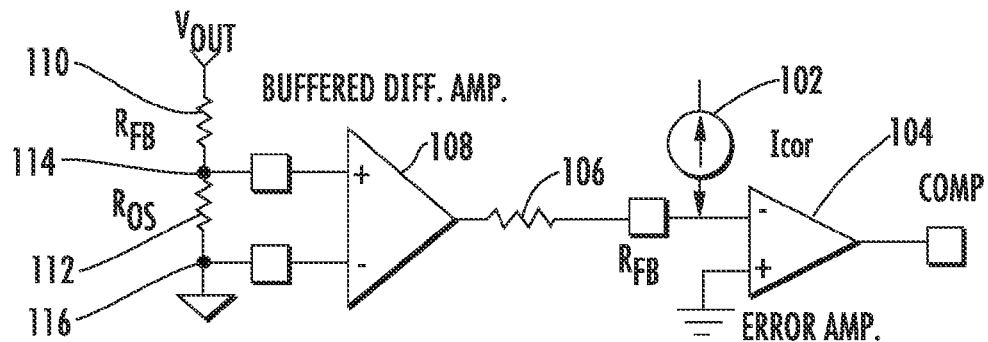
FIG. 1 illustrates a first embodiment of a prior art current sharing scheme.
Figure 2:
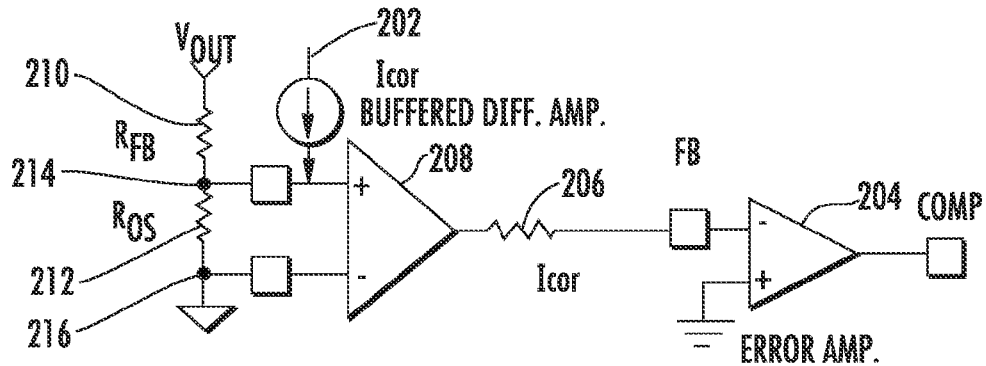
FIG. 2 illustrates an alternative embodiment of a prior art current sharing scheme.
Figure 3:
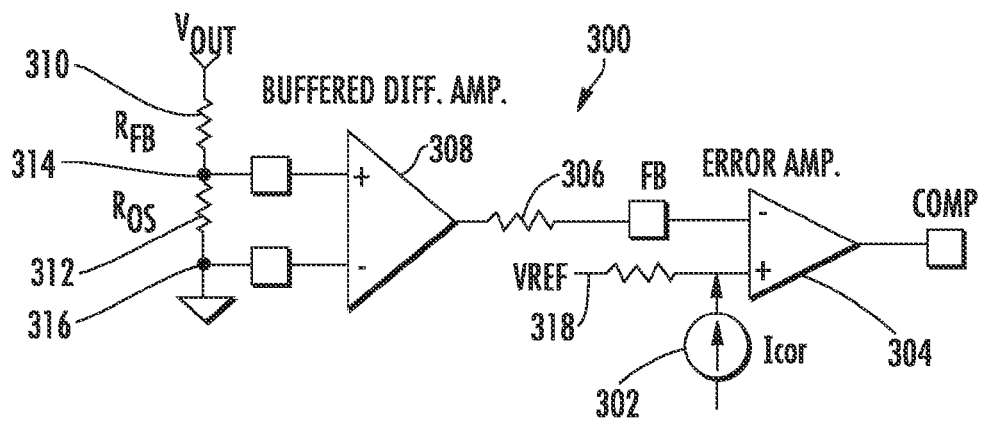
FIG. 3 illustrates yet a further embodiment of a prior art current sharing scheme.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Figure 4:
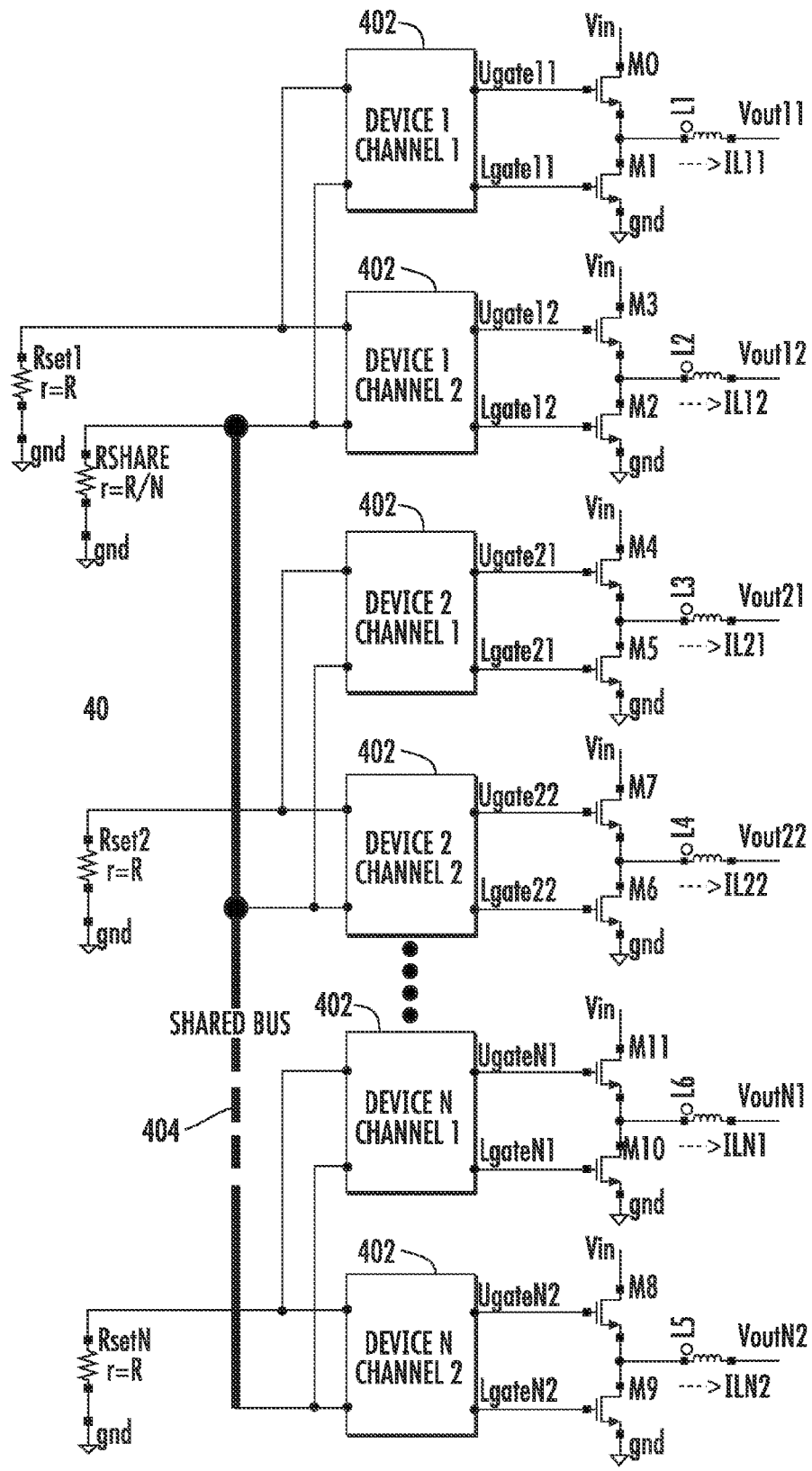
FIG. 4 illustrates a plurality of independent power modules connected via a shared bus requiring current sharing capabilities.

Referring now the drawings, and more particularly to FIG. 4, there is provided a top-level diagram illustrating a plurality of independent power modules 402. The power modules 402 provide drive signals to a plurality of associated transistors of a voltage regulator circuit. The independent power modules 402 are interconnected via a shared bus 404 through which the current sharing requirements arise during, for example, steady state, system power-up, system power-down or load transients.

Figure 5:
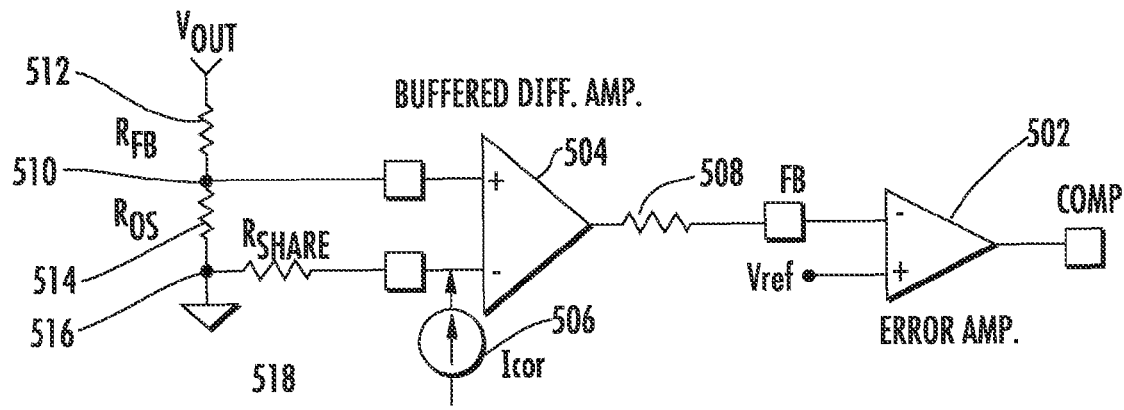
FIG. 5 illustrates a multi-module current sharing scheme according to the present disclosure.

Referring now to FIG. 5, there is illustrated the proposed multi-module current sharing scheme of the present disclosure. In this configuration, an error amplifier 502, buffered differential amplifier 504 and sourcing correction current ($I_{COR}$) 506 are each included internally within the independent power modules 402. The error amplifier 502 has its output connected to the COMP pin of the associated independent power module 402 and its negative input connected to the FB pin of the independent power module 402. The positive input of the error amplifier 502 would be connected to reference voltage $V_{REF}$. A resistor 508 external to the independent power module 402 is connected between the FB pin and the output of the buffered differential amplifier 504. Internally, within the independent power module 402, the correction current $I_{COR}$ 506 is generated and sourced to the negative input of the buffered differential amplifier 504. The positive input of the buffered differential amplifier 504 is connected to an external pin of the independent power module 402 which is connected to a node 510 of a voltage divider network consisting of resistor $R_{FB}$ 512 and resistor $R_{OS}$ 514. Resistor 512 has a first end connected to receive the output voltage $V_{OUT}$ and the second end connected to node 510. The resistor $R_{OS}$ 514 is connected between node 510 and node 516 which is connected to ground (remote ground).

A resistor $R_{SHARE}$ 518 is connected between node 516 and the pin connected with the negative input of the buffered differential amplifier 504. Using the $R_{SHARE}$ resistor 518, the current sharing feature of the independent power modules 402 may be enabled or disabled and the amount of correction current controlled. The dynamic range of the current sharing functionality is programmable by altering the value of the $R_{SHARE}$ resistor 518. The $R_{SHARE}$ resistor 518 sets the maximum current correction and increases the offset of the negative input of the differential amplifier 504. This increases the regulation point of the slave power module 402 such that the slave module will deliver more current until it catches up the average current of all modules. When the $R_{SHARE}$ resistor 518 is set to zero ohms, this current sharing loop of the device (controller) is disabled and makes no more output voltage correction. However, the correction then can be applied to the internal COMP voltage to balance current in between devices, which together operate in multi-phase (more than 2 phases as in FIG. 4) operation.

Figure 6:
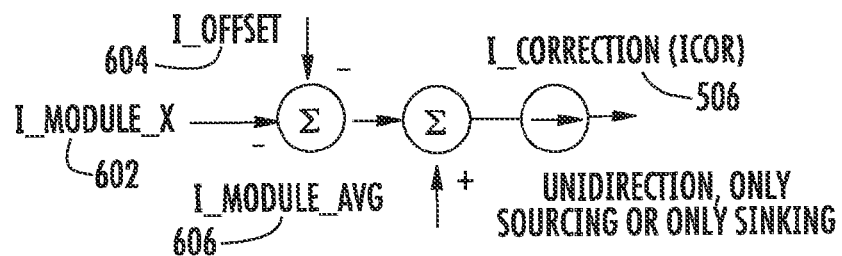
FIG. 6 illustrates a functional diagram of the process for generating the correction current ($I_{COR}$)

Referring now also to FIG. 6, there is illustrated a general functional level diagram for the manner in which the correction current $I_{COR}$ 506 is generated. The correction current $I_{COR}$ 506 is sourced to the negative input of the buffered differential amplifier 504 internally within the independent power module 402. The individual module current 602, which is provided by the $I_{SET}$ pin of the individual power module in, for example, an ISL8120 Module provided by Intersil, Inc., is added to the current offset value $I_{OFFSET}$ 604. These combined current values are subtracted from the average current of all the power modules (I_modules_avg 606) provided from, for example, the $I_{SHARE}$ pin of an ISL8120. This difference is amplified and provided as the correction current $I_{COR}$ 506. I_offset is required such that when a module is running alone no current correction is made. The $R_{SHARE}$ resistor sets the maximum current correction and increases the offset of the negative input of the differential amplifier, which increase the regulation point of the slave module such that the slave module will deliver more current until it catches up with the average current of all of the modules.

Figure 7:
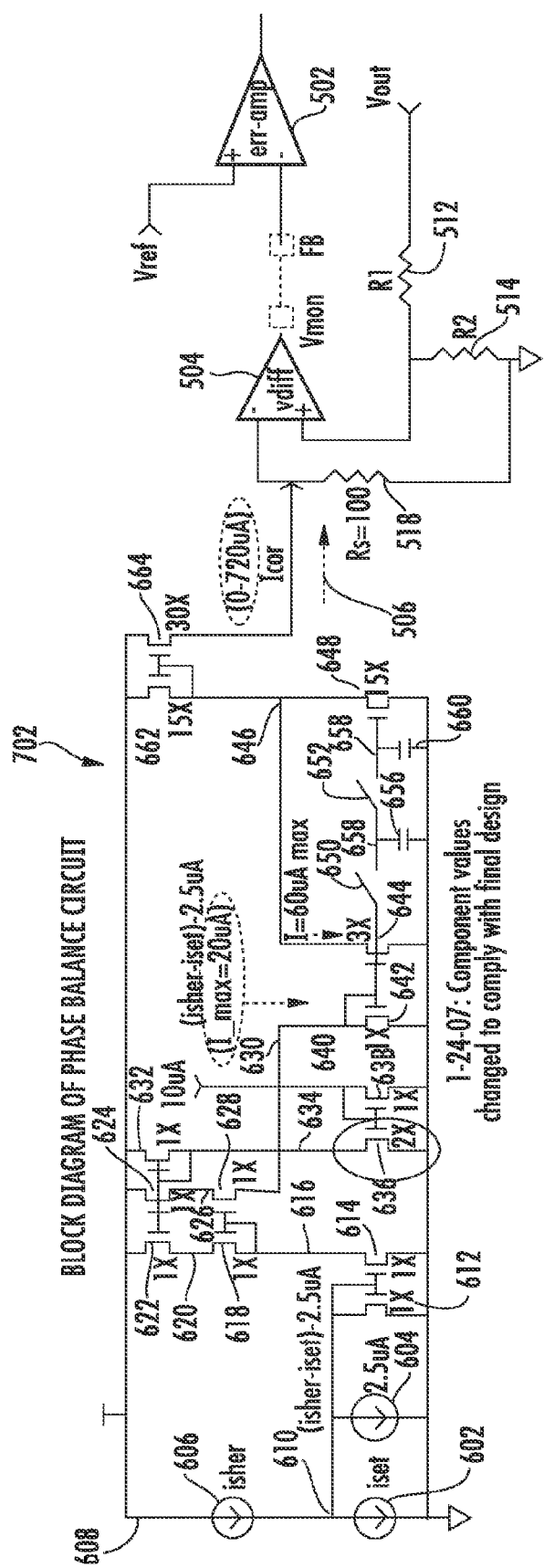
FIG. 7 illustrates on embodiment of circuitry for generating the correction current $I_{COR}$ within an independent power module.

Referring now to FIG. 7, there is illustrated a block diagram of a phased-balanced circuit 702 for generating the correction current $I_{COR}$ 506. $I_{SHARE}$ 704 comprises the average current 706. The $I_{SET}$ current comprises the individual module current 702. An offset current 704 of 2.5 micro-amps is also provided. Average current 706 is connected between system power node 708 and node 710. Current source 702 and offset current 704 are connected in parallel between node 710 and ground. A transistor 712 is connected between node 710 and ground. The gate of transistor 712 is also connected to node 710. A second transistor 714 is connected between node 716 and ground. The gate of transistor 714 is also connected to node 710. A transistor 718 is connected between node 720 and node 716. The gate of transistor 718 is connected to node 716. A transistor 722 is connected between node 720 and system power node 708. Transistor 724 is connected between the system power node 708 and node 726. The gate of transistor 724 is connected to the gate of transistor 722. Transistor 728 is connected between node 726 and node 730. The gate of transistor 728 is connected to the gate of transistor 718 to node 716. Transistor 732 is connected between system power node 708 and node 734. A transistor 736 is connected between node 734 and ground. The gate of transistor 736 is connected to transistor 738. The gates are further connected to node 740. Transistor 738 is connected between node 740 and ground. Node 740 receives a 10 micro-amp current.

A transistor 742 is connected between node 730 and ground. The gate of transistor 742 is connected to node 730 and also to the gate of transistor 744. Transistor 744 is connected between node 746 and ground. The gate of transistor 744 is also connected to a transistor 748 through a switch 750 and a switch 752. Transistor 750 is connected between the gate of transistor 744 and node 754. A capacitor 756 is connected between nodes 754 and ground. The switch 752 is between nodes 754 and 758. Node 758 is connected to ground through a capacitor 760 and is also connected to the gate of transistor 748. Transistor 762 is connected between the system power node 608 and node 746. The gate of transistor 762 is connected to the gate of transistor 764 and to node 746.

Transistor 764 is connected between system power node 708 and the negative input of the buffered differential amplifier 504. The output of the transistor 764 is correction current $I_{COR}$ 506. It should be realized that the implementation of FIG. 7 illustrates only one manner for generating the correction current $I_{COR}$ and numerous other methods and circuits for generating the correction current are available.

Figure 8:
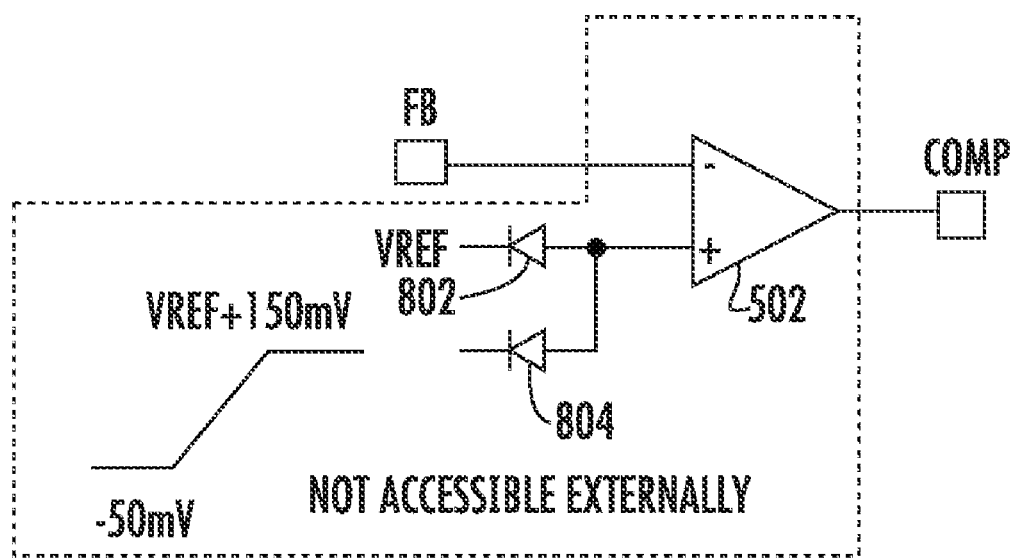
FIG. 8 illustrates a soft start implementation with which the current sharing scheme of FIG. 5 would be applicable.

Referring now to FIG. 8, there is illustrated one manner for providing a digital softstart through the reference voltage $V_{REF}$ applied to the positive input of the error amplifier 502. The reference voltage $V_{REF}$ is applied to a first diode 802, and a ramped current from −50 mV to +150 mV is applied through a second diode 804. The voltage $V_{REF}$ is a fixed voltage and the positive input of the error amplifier 502 only sees the voltage $V_{REF}$ after the softstart voltage applied to the second diode 804 had risen above $V_{REF}$. If the correction current $I_{COR}$ is added to $V_{REF}$, the current correction is not applied during power up and shut down. If the correction current $I_{COR}$ were added into the softstart ramp, after the softstart has risen above $V_{REF}$, there is no correction during normal system operation. The anodes of each of the diodes 802 and 804 are connected to the positive input of the error amplifier 502. The cathode of diode 802 is connected to the reference voltage $V_{REF}$ and the cathode of the diode 804 is connected to receive the softstart voltage ramp.

Using the above-described system, the dynamic range of the current sharing scheme is programmable via the $R_{SHARE}$ resistor and the sharing feature may be disabled by setting the $R_{SHARE}$ resistor to zero ohms. Furthermore, for wide output voltage applications with trimming capabilities, choices of the voltage divider network consisting of resistors $R_{FB}$ and $R_{OS}$ will not be limited.

It will be appreciated by those skilled in the art having the benefit of this disclosure that this invention provides a current sharing scheme provide greater control of an applied correction current. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A multimodule current sharing system, comprising:
    a plurality of power modules sharing current on a common bus;
    wherein each of the plurality of power modules includes circuitry for controlling an amount of current correction applied to each of the plurality of power modules, wherein the circuitry for controlling further includes;
        first circuitry for generating an error voltage responsive to a reference voltage and an output voltage;
        a correction current source applied to the first circuitry wherein a current provided by the correction current source includes a combination of a current of one of the plurality of power modules and a selected offset current subtracted from an average current of each of the plurality of power modules; and
        a first resistor connected to the first circuitry, wherein a value of the first resistor controls the amount of voltage correction applied to the first circuitry by the correction circuit source, wherein the value of the first resistor may further enable or disable current sharing among the plurality of power modules.

2. The multimodule current sharing system of claim 1, wherein the circuitry for controlling further comprises:
    an error amplifier having a negative and a positive input and an output, the positive input of the error amplifier connected to a reference voltage;
    a buffered differential amplifier having an output connected to the negative input of the error amplifier and a positive and a negative input.

3. The multimodule current sharing system of claim 1, wherein the first resistor is set to 0 ohms to disable current sharing.

4. The multimodule current sharing system of claim 2, further including a resistor divider network connected to the positive and the negative inputs of the buffered differential amplifier.

5. The multimodule current sharing system of claim 2, wherein a soft start voltage ramp is also applied to the positive input of the error amplifier.

6. A multimodule current sharing system, comprising:
    a plurality of power modules sharing current on a common bus; and
    wherein each of the plurality of power modules includes circuitry for controlling an amount of current correction applied to each of the plurality of power modules, said circuitry comprising:
        an error amplifier having a negative and a positive input and an output, the positive input of the error amplifier connected to a reference voltage;
        a buffered differential amplifier having an output connected to the negative input of the error amplifier and a positive and a negative input;
        a correction current source applied to the negative input of the buffered differential amplifier; and
        a first resistor connected to the negative input of the buffered differential amplifier, wherein a value of the first resistor controls the amount of voltage correction applied to the negative input of the buffered differential amplifier by the correction current source, the first resistor further enabling and disabling current sharing responsive to a value of the first resistor.

7. The multimodule current sharing system of claim 6, wherein the first resistor is set to 0 ohms to disable current sharing.

8. The multimodule current sharing system of claim 6, further including a resistor divider network connected to the positive and the negative inputs of the buffered differential amplifier.

9. The multimodule current sharing system of claim 6, wherein a current provided by the correction current source includes a combination of a current of one of the plurality of power modules and a selected offset current subtracted from an average current of each of the plurality of power modules.

10. The multimodule current sharing system of claim 6, wherein a soft start voltage ramp is also applied to the positive input of the error amplifier.

11. A circuit for providing multimodule current sharing for a circuit module, comprising:
    an error amplifier having a negative and a positive input and an output, the positive input of the error amplifier connected to a reference voltage;
    a buffered differential amplifier having an output connected to the negative input of the error amplifier and a positive and a negative input;

a correction current source applied to the negative input of the buffered differential amplifier; and a first resistor connected to the negative input of the buffered differential amplifier, wherein a value of the first resistor controls the amount of voltage correction applied to the negative input of the buffered differential amplifier by the current correction source.

12. The circuit of claim 11, wherein the first resistor may further enable and disable current sharing.

13. The circuit of claim 12, wherein the first resistor is set to 0 ohms to disable current sharing.

14. The circuit of claim 11, further including a resistor divider network connected to the positive and the negative inputs of the buffered differential amplifier.

15. The circuit of claim 11, wherein a current provided by the correction current source includes a combination of a current of one of the plurality of power modules and a selected offset current subtracted from an average current of each of the plurality of power modules.

16. The circuit of claim 11, wherein a soft start voltage ramp is also applied to the positive input of the error amplifier.

* * * * *